United States Patent Office 3,472,808
Patented Oct. 14, 1969

---

3,472,808
NOVEL DIENE COPOLYMERS
Irving E. Isgur, Framingham, and John L. Ohlson, Bedford, Mass., assignors to W. R. Grace & Co., Cambridge, Mass., a corporation of Connecticut
No Drawing. Continuation-in-part of application Ser. No. 587,657, Oct. 19, 1966. This application Nov. 2, 1967, Ser. No. 680,003
Int. Cl. C08d 3/02; C08f 15/40, 1/13
U.S. Cl. 260—29.7                         7 Claims

ABSTRACT OF THE DISCLOSURE

The disclosure is of copolymers containing: (1) a conjugated diene, (2) styrene and/or acrylonitrile, (3) vinylidene chloride and (4) a functional monomer, which can be acrylamide, methacrylamide, octyl acid maleate or a monoethylenically unsaturated mono- or dicarboxylic acid (e.g. acrylic or itaconic acid).

---

This application is a continuation-in-part of application Ser. No. 587,657 filed Oct. 19, 1966, and now abandoned, which is a continuation-in-part of application Ser. No. 364,752 filed May 4, 1964, now abandoned.

This invention relates to novel diene copolymer compositions and more particularly to novel diene copolymer latices.

The novel copolymer compositions of the present invention are formed by copolymerizing the following monomers: (1) a conjagated diene, for example of 4 to about 9 carbon atoms, such as butadiene or isoprene, (2) at least one monomer of the formula $$CH_2=CH$$
$$|$$
$$R$$

wherein R is a phenyl or cyano group, e.g., styrene or acrylonitrile, (3) vinylidene chloride and (4) a functional monomer comprising one of the group of acrylamide, methacrylamide, octyl acid maleate and monoethylenically unsaturated monocarboxylic and dicarboxylic acids of 3 to about 12, preferably 3 to about 5 carbon atoms, e.g., acrylic acid, cinnamic acid, methacrylic acid, crotonic acid, itaconic acid, maleic acid, fumaric acid, etc. The preferred mono- and dicarboxylic acid functional monomers used in the composition of the invention are acrylic acid, methacrylic acid and itaconic acid. Further, the mono- or dicarboxylic acids may contain non-deleterious substituents, for example, halogen which do not adversely affect copolymerization of the acid monomer.

The term functional monomers as used herein is intended to refer to the reactivity of the functional group of the monomer and not the relative reactivity of the monomers themselves to addition polymerization. The functional monomers of the present invention interact or react with materials which they contact in the end use of the polymers e.g., cross-linking interaction with or adhesion to, a substrate such as cellulose.

The ratio of the components may vary over a relatively wide range. Generally, the ratios of the components are as follows:

Conjugated diene—25 to 70 percent preferably 40–65, more preferably 55–60 percent $CH_2=CH$ monomer—5 to 70 percent, preferably 30 to 65
percent Vinylidene chloride—1 to 50 percent, preferably 3 to 15 percent Functional monomer—0.5 to 15 percent, preferably 1 to 4 percent The novel copolymer compositions of the present invention may be prepared by various methods known to the art for preparing butadiene-type copolymers, such as bulk or emulsion polymerization processes. Since the novel compositions of the present invention are particularly useful as latices, emulsion polymerization is preferred.

The novel copolymer compositions of the present invention have been found to possess particularly desirable properties when prepared by the emulsion polymerization process of the copending application of Donald Goodman, Irving E. Isgur, and Donald M. Wacome, Ser. No. 364,761 filed May 4, 1964, now Patent No. 3,397,165.

The emulsion polymerization process of the copending application comprises the steps of initially charging a reactor with a relatively small quantity of polymer latex as a seed to provide the nucleating sites for polymerization and adding, substantially continuously, monomers and emulsifier at a controlled rate. The seed provides the only source of nucleating sites in the reaction. The rate of monomer addition is such that the added monomer becomes associated with the polymer particles in the reactor as soon as the monomer enters the reaction zone and a separate monomer phase is not formed. The rate of emulsifier addition is proportional to the rate of growth of particle surface area. The emulsifier is added at a rate such that only about 30 to 70 percent of the surface area of the particle is covered with emulsifier.

The following nonlimiting examples illustrate the preparation of the novel compositions of the present invention.

EXAMPLE 1

Into a polymerization vessel were placed 6.75 parts of a 60:40 styrene:butadiene copolymer latex containing 2.7 parts solids and having an average particle size of 600 A. To the above was added with agitation 0.227 part sodium pyrophosphate, 0.061 part sodium dodecyl benzene sulfonate, and 44.60 parts of water. The reactor was then purged with nitrogen for 30 minutes. The temperature of the reaction mixture was raised to 170° F., and this temperature was maintained throughout the reaction. A solution of 1.009 parts of potassium persulfate in 23.780 parts of water was then added to the reactor. The continuous addition of a mixture of 61.67 parts of styrene, 33.33 parts of butadiene, 3.33 parts vinylidene chloride, 1.67 parts methacrylic acid, and 0.1 part dodecyl mercaptan was begun at the rate of 16.667 parts per hour. After the monomer addition had begun, the continuous addition of an emulsifier solution of 1.356 parts of sodium dodecyl benzene sulfonate and 0.663 part of sodium oleoyl isopropenol amide sulfosuccinate in 28.96 parts of water was begun. The emulsifier solution was added at a non-linear rate according to the schedule set forth below.

| Elapsed reaction time (hours): | Percent of added emulsifier |
|---|---|
| 1 | 11.1 |
| 2 | 33.4 |
| 3 | 50.8 |
| 4 | 66.0 |
| 5 | 80.0 |
| 6 | 92.5 |
| 7 | 100.0 |

The reaction mixture was maintained at 170° F. for 4 hours after the completion of the monomer addition. The maximum pressure in the reactor was 70 p.s.i. The reaction went to 97.2 percent conversion. The average particle size of the product was 2000 A. ±200 A., the pH was about 415, the solids 48.6 percent, and the surface tension was 45 dynes/cm.

EXAMPLE 2

The procedure described in Example 1 was carried out using the same seed and emulsifier with the following monomeric mixture:

| | Parts |
|---|---|
| Styrene | 41.67 |
| Butadiene | 50.00 |
| Vinylidene chloride | 6.66 |
| Methacrylic acid | 1.67 |

The reaction went to 96.6 percent conversion and a total solids content of 48.3 percent. The product had an average particle size of 1950 A. ±200 A. and a surface tension of 52 dynes/cm.

EXAMPLE 3

The procedure described in Example 1 was carried out using the same seed and emulsifier with the following monomeric mixture:

| | Parts |
|---|---|
| Styrene | 43.3 |
| Butadiene | 50.0 |
| Vinylidene chloride | 3.3 |
| Methacrylic acid | 3.3 |

The reaction time was 10⅓ hours, and the conversion was 90.5 percent.

EXAMPLE 4

The procedure of Example 1 was carried out using the same seed and emulsifier with the following monomeric mixture:

| | Parts |
|---|---|
| Styrene | 8.3 |
| Butadiene | 50.0 |
| Vinylidene chloride | 40.0 |
| Methacrylic acid | 1.7 |

The reaction time was 8⅔ hours, and the conversion was 86 percent.

EXAMPLE 5

The procedure described in Example 1 was carried out using the same seed and emulsifier with the following monomeric material:

| | Parts |
|---|---|
| Styrene | 60.0 |
| Butadiene | 33.3 |
| Vinylidene chloride | 3.3 |
| Itaconic acid | 3.4 |

EXAMPLE 6

A composition was prepared as in Example 5 substituting crotonic acid for itaconic acid.

EXAMPLE 7

The procedure described in Example 1 was carried out using the same seed and emulsifier with the following monomeric mixture:

| | Parts |
|---|---|
| Styrene | 61.7 |
| Butadiene | 33.3 |
| Vinylidene chloride | 3.3 |
| Octyl acid maleate | 1.7 |

EXAMPLE 8

The procedure described in Example 1 was carried out using the same seed and emulsifier with the following monomeric mixture:

| | Parts |
|---|---|
| Styrene | 1.6 |
| Butadiene | 65.4 |
| Acrylonitrile | 26.0 |
| Vinylidene chloride | 5.0 |
| Acrylic acid | 2.0 |

EXAMPLE 9

The procedure described in Example 1 is carried out using the same seed and emulsifier with the following monomeric mixture:

| | Parts |
|---|---|
| Styrene | 43.4 |
| Butadiene | 50.0 |
| Vinylidene chloride | 3.3 |
| Methacrylamide | 3.3 |

EXAMPLE 10

A composition is prepared as in Example 9 substituting acrylamide for methacrylamide.

The novel copolymer latices of the present invention may be used in preparing rug backings, paints and coatings, adhesives, free films, and for impregnating paper for use in gaskets, etc. The compositions of the present invention generally show a greater degree of solvent resistance than prior art butadiene copolymers.

It has also been found, unexpectedly, that latices of the copolymer compositions of the present invention possess good aging properties when used in coating formulations, e.g., paints. The vinylidene chloride, unexpectedly, does not decompose into hydrochloric acid, the formation of which would be highly detrimental to the stability of the product in which the copolymer is used.

As stated above, the novel copolymers of the present invention are preferably utilized as an aqueous dispersion. Such copolymers may also be utilized as coatings or impregnants from solvent systems if they do not possess a relatively high degree of cross-linking. Copolymers which may be used in solvent systems are generally prepared at temperatures not in excess of 125° F. Preferred solvents include toluene and xylene. Solvent compositions may be prepared by coagulating a latex of the copolymer, such as the latex of Example 1, and then dissolving the thus-coagulated polymer in, for example, toluene, xylene and dimethyl formamide. Although the concentration of the polymer may be varied over a relatively wide range, a particularly useful solution contains 25 to 50 percent copolymer. Solvent compositions may also be prepared utilizing suitable solvents and copolymers prepared by solvent polymerization or suspension polymerization as well as emulsion polymerization.

Free films of the novel copolymers of the present invention may also be prepared by casting a layer of latex or solution of the polymer on a suitable surface, e.g., a glass plate, drying, and then removing the thus-formed film. Free films may also be prepared by coagulating the polymer from the latex, washing, and then extruding the film by methods known to the art.

We claim:

1. A novel copolymer composition consisting essentially of the following copolymerized monomeric constituents: (a) 25 to 70 percent by weight of a conjugated diene of 4 to about 9 carbon atoms, (b) 5 to 70 percent by weight of at least one monomer of the formula

wherein R is selected from the group consisting of phenyl and cyano radicals, (c) 1 to 50 percent by weight of vinylidene chloride, and (d) 0.5 to 15 percent by weight of a functional monomer selected from the group consisting of acrylamide, methacrylamide, octyl acid maleate and monoethylenically unsaturated monocarboxylic and dicarboxylic acids of 3 to about 12 carbon atoms.

2. The composition of claim 1 wherein said diene is butadiene.

3. A composition as defined in claim 1 where the composition is in an aqueous dispersion.

4. A composition as defined in claim 1 wherein the composition is a free film.

5. A novel copolymer composition consisting essentially of the following copolymerized monomeric constituents: (a) 25 to 70 percent by weight of butadiene, (b) 5 to 70 percent by weight of at least one monomer of the formula

wherein R is selected from the group consisting of phenyl and cyano radicals, (c) 1 to 50 percent by weight of vinylidene chloride, and (d) 0.5 to 15 percent by weight of a functional monomer selected from the group consisting of acrylamide, methacrylamide, octyl acid maleate, acrylic acid, methacrylic acid and itaconic acid.

6. The composition of claim 5 wherein said monomer of the formula

is styrene.

7. The composition of claim 5 consisting essentially of 55 to 60 percent by weight of said (a) constituent; 30 to 65 percent by weight of said (b) constituent; 3 to 15 percent by weight of said (c) constituent; and 1 to 4 percent by weight of said (d) constituent.

References Cited

UNITED STATES PATENTS 2,698,318   12/1954   Brown _____ 260—80.7
2,724,707   11/1955   Brown _____ 260—80.7

FOREIGN PATENTS 862,372   3/1961   Great Britain.

MURRAY TILLMAN, Primary Examiner
W. J. BRIGGS, Sr., Assistant Examiner

U.S. Cl. X.R.

117—122, 155, 161; 260—78.5, 80.7